N. C. JOHNSON.
ABSORPTION DYNAMOMETER.
APPLICATION FILED JAN. 7, 1914.

1,141,802.

Patented June 1, 1915.
2 SHEETS—SHEET 1.

WITNESSES:
William F. Nase
Walter Chism

INVENTOR
Nathan C. Johnson.
BY
Howson & Howson
ATTORNEY

UNITED STATES PATENT OFFICE.

NATHAN C. JOHNSON, OF ENGLEWOOD, NEW JERSEY, ASSIGNOR TO TINIUS OLSEN TESTING MACHINE COMPANY, OF PHILADELPHIA, PENNSYLVANIA, A CORPORATION OF PENNSYLVANIA.

ABSORPTION-DYNAMOMETER.

1,141,802.  Specification of Letters Patent.  Patented June 1, 1915.

Application filed January 7, 1914. Serial No. 810,841.

*To all whom it may concern:*

Be it known that I, NATHAN C. JOHNSON, a citizen of the United States, residing in Englewood, county of Bergen, State of New Jersey, have invented certain Improvements in Absorption-Dynamometers, of which the following is a specification.

One object of my invention is to provide a novel, inexpensive and relatively simple mechanism for measuring the power output of gas, gasolene or other engines or prime movers, it being particularly desired that such mechanism shall be so constructed and have such an arrangement of parts as will give good speed regulation and highly accurate results.

I further desire to provide a machine of the above noted character, in which there shall be no undue gripping or slipping between the surfaces in frictional engagement and consequently no variation in speed of the prime mover under test or inaccuracy in the readings obtained.

These objects and other advantageous ends I secure as hereinafter set forth, reference being had to the accompanying drawings, in which:—

Figure 2:
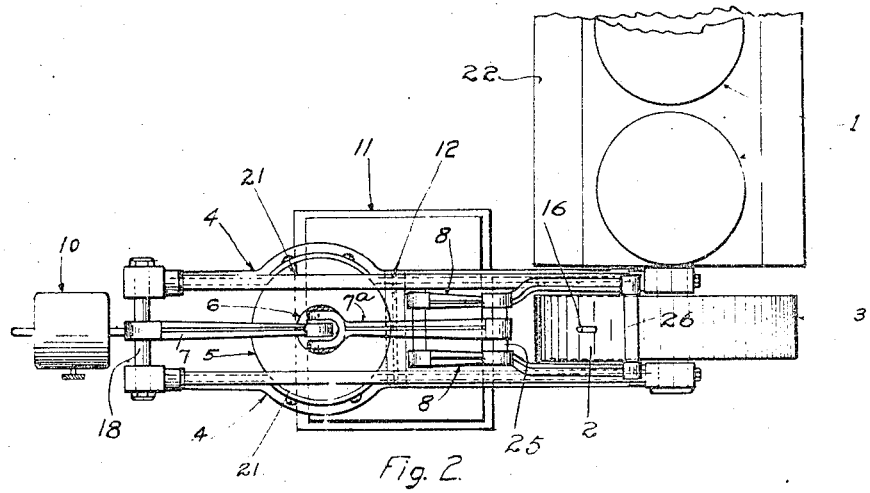
Figure 1:
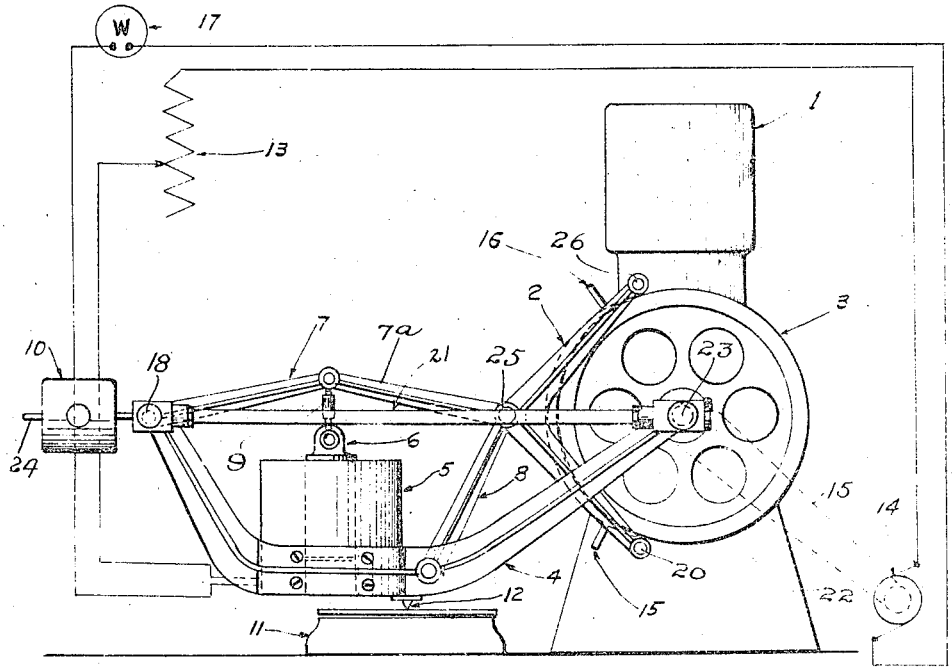
Figure 3:
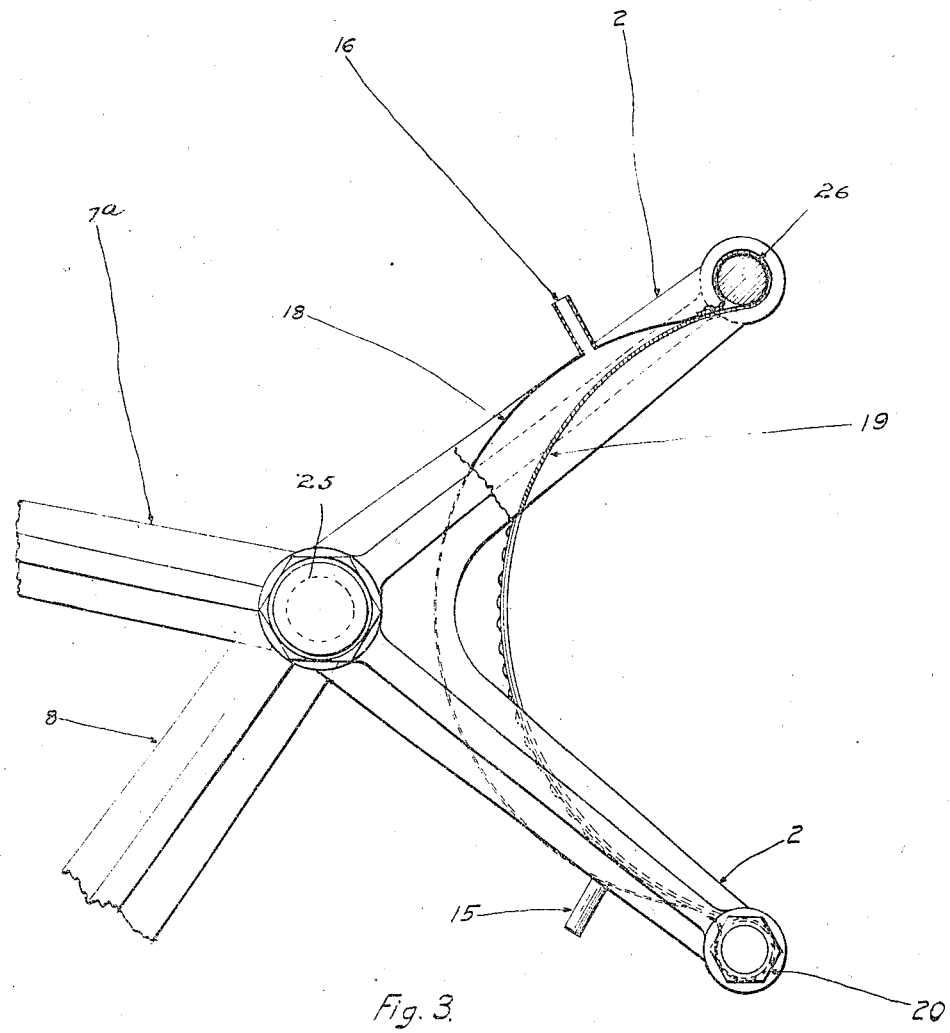

Figure 1 is a side elevation, to some extent diagrammatic, illustrating my invention as applied to an engine to be tested; Fig. 2 is a plan of a portion of the mechanism shown in Fig. 1, a portion of the electric apparatus and its associated wiring being omitted for the sake of clearness, and Fig. 3 is a side elevation, partly in section, illustrating the detail construction of the preferred form of brake usually employed as part of my invention.

In the above drawings, 1 represents cylinders of an engine to be tested which are mounted upon a base structure 22. On the shaft 23 of said engine is mounted a fly wheel 3, against which the brake shoe of my testing apparatus is designed to act. Said apparatus consists of a suitable form of electric generator 14, (belted to or otherwise) driven from the engine through a belt 15 or other suitable form of gearing. In circuit with this generator is a wattmeter 17, an adjustable rheostat 13 and a relatively powerful ironclad electro-magnet 5. Said magnet is mounted on a frame composed of a pair of similarly formed side pieces 4 which are provided with a knife-edge bearing 12, resting upon the platform of a suitable form of weighing device 11, such as a platform scale. The side pieces 4 are extended upwardly on one side of the magnet 5, and their adjacent ends, in addition to being connected by a spindle 18, are respectively connected to tension rods 21. These latter are also connected to the opposite and upwardly extending ends of said side pieces which are provided with bearings for the shaft 23 of the engine.

The core or plunger 6 of the electro-magnet 5 is connected through a link 9 to two toggle links 7 and 7ª at their point of pivotal connection and one of said links 7 at its free end is journaled on the spindle 18, having a rearward extension 24 adjustably carrying a counterweight 10. The second end of the toggle link 7ª is connected to a spindle 25 which in addition to engaging the upper ends of a pair of links 8 is hinged or pivoted to a brake shoe, the lower ends of the links 8 being respectively pivoted to the side piece 4. The brake shoe 2 as shown in Fig. 3 consists of a pair of V-shaped castings, each pivotally mounted on the pivot pin 25 at its apex and having the free ends of their upwardly extending arms connected by a bolt or bar 26. Similarly, the lower ends of the two sets of arms are connected by a pin 20, while between this and the pin 27 extends a sheet or band of thin metal of suitable gage and of such length that it naturally assumes or may be bent into the shape of an arc of a circle. To the back of this body of thin metal is fastened a loose rubber or waterproof casing 18 having an inlet 16, and outlet 15, the arrangement of parts being such that the strip or sheet of metal 19 constitutes with said casing an elongated water container or water jacket, whereby said strip may be very effectually cooled under operating conditions.

It is to be noted that the shoe formed by the metal sheet 19 and its associated parts is relatively flexible, so as to accommodate itself to the surfaces of fly wheels whose diameters differ within predetermined limits.

Under conditions of operation, the engine is put in operation and through the belt or other gearing drives the generator 14. This latter is of such a construction that it has a straight line speed-volts characteristic, with the result that the quantity of current flowing through the circuit of which it forms a part is directly proportional to the speed at which it is driven. Such current therefore flows in the circuit which includes this generator, the rheostat, and the electro-magnet 5, energizing the latter so that it draws down its core 6. As a consequence, the toggle levers 7 and 7ª are caused to approach a straight line position and force the brake shoe 2 toward the shaft 23, thus bringing the flexible metal band 19 into intimate frictional contact with the surface of the fly wheel and exerting a braking or retarding effect thereon. Obviously, the greater the output of the generator 14, the greater will be the pull of the electro-magnet and the greater the thrust of the toggle bars 7 and 7ª. Therefore, when this thrust exerts more than a predetermined retarding force on the fly wheel, the engine will slow down, thus causing a drop in the generator voltage and a lessening of the force exerted by the magnet. Consequently the braking force is reduced and the engine again comes up to speed, it being noted that under working conditions the rheostat 13 and the carbureter of the engine may be adjusted so as to maintain a predetermined and constant load on said engine for practically an indefinite time. The brake shoe is cooled by water from a suitable source, circulated through the container or chamber formed by the band 19 and the casing 1. the liquid entering, for example, by the pipe 16 and leaving by the pipe 15.

It will be understood that the shaft of the engine and hence the fly wheel, is turned in such a direction as to cause a downward force to be exerted by the apparatus upon the platform of the weighing apparatus 11, the downward thrust of the brake shoe 2, due to its friction against the fly wheel, being taken up by the arms 8 and communicated through the frame 4 and knife-edge 12 to said platform. The turning moment due to the friction between the shaft 23 and the bearings at the end of the side pieces 4 is also transmitted to the knife-edge 12 and thence to the weighing apparatus, so that there are no losses in my device, due to the use of outside mechanism.

With this arrangement of parts, the power generated by the engine may be read off directly on a special scale beam (not shown) actuated from the platform of the weighing apparatus, or it may be computed in the same manner as when a Prony brake is used. In order to obtain the total power generated by the engine, the output of the generator 14 as indicated by the wattmeter 17, plus the internal losses of the generator and its gearing must be added to the readings obtained from the use of the brake.

With the above described arrangement of parts, it will be noted that there are no strains on the engine shaft because the thrust of the brake is taken up by the two sets of bearings of the side pieces 4 and tension rods 21. By the use of the type of brake shoe shown, the most complete and intimate contact is maintained with the wheel surface throughout the entire arc of the shoe and by reason of this complete contact, as well as on account of the thinness of the material comprising the sheet 19, the heat transmission from the friction surfaces to the water and the cooling of the shoe, is accomplished with high efficiency. Further, any slight variation in the diameter of the fly wheel is automatically provided for by reason of the flexibility of the sheet 19 and its water jacket, which is, therefore, not only a decided improvement over a shoe turned out to an exact and unvarying radius, but is likewise cheap to construct and easily renewable.

Under operating conditions, the various parts so co-act that there is no alternate gripping and slipping of the engaging surfaces, so that the speed is maintained practically constant and accurate readings are obtainable.

I claim:—

1. The combination in an absorption dynamometer of a stationary friction member formed to engage a rotating member; an electro-magnet for actuating said friction member; with an electric generator driven by the rotary element and electrically connected to the electro-magnet.

2. The combination in an absorption dynamometer of a stationary friction member formed to engage a rotating member; an electro-magnet for actuating said friction member; an electric generator driven by the rotary element and electrically connected to the electro-magnet; and a device for measuring the rotative force exerted on the friction member.

3. The combination in an absorption dynamometer of a member for frictionally engaging a rotating element; an electro-magnet for actuating said friction member; a weighing apparatus for measuring the rotative force exerted on said member; a generator driven by the rotating element, and connections between said generator and the electro-magnet.

4. The combination in an absorption dynamometer of a member for frictionally engaging a rotating element; an electro-magnet for actuating said friction member; a weighing apparatus for measuring the rotative force exerted on said member; a generator driven by the rotating element; connections between said generator and electro-magnet; with means for varying the current flowing from the generator to the electro-magnet.

5. The combination in an absorption dynamometer of a brake shoe; a rotary member;

an electromagnet independent of said parts and mounted to force said shoe into engagement with the periphery of the rotary member; and a device for measuring the force exerted on said rotary member by said brake shoe.

6. The combination in an absorption dynamometer of a rotary shaft; a frame journaled on said shaft; a brake shoe carried by the frame and mounted to retard revolution of the shaft; an electromagnet also carried by the frame and operative on the brake shoe; and a weighing device partially supporting the frame and mounted to measure the force exerted on said shaft by said shoe.

7. The combination in an absorption dynamometer of a rotary shaft; a frame journaled on said shaft; a brake shoe carried by the frame; an electro-magnet also carried by the frame and operative on the brake shoe; and an electric generator driven by said shaft and electrically connected to the electro-magnet.

8. The combination in an absorption dynamometer of a rotary shaft; a frame journaled on said shaft; a brake shoe carried by the frame; an electro-magnet also carried by the frame and operative on the brake shoe; an electric generator driven by said shaft and electrically connected to the electromagnet; and a device for measuring the rotative force exerted by the shaft on said frame.

9. The combination in an absorption dynamometer of a rotary shaft; a frame journaled on said shaft and provided with a knife-edge; a brake shoe; an electro-magnet carried by the frame; mechanism for operatively connecting the electro-magnet and the brake shoe; and a weighing device operatively engaged by said knife-edge.

10. The combination in an absorption dynamometer of a frame formed to operatively engage a shaft; an electro-magnet mounted on said frame; a brake shoe also carried by the frame; with a toggle actuated by the movable member of the electro-magnet and operative on the brake shoe.

11. The combination in an absorption dynamometer of a frame having bearings for the reception of a shaft; a brake shoe carried by the frame in position to engage a member mounted on the shaft; an electromagnet; a toggle having one link pivoted to the frame and the other pivoted to the brake shoe; with means for connecting the two links of the toggle to the movable member of the electro-magnet.

12. The combination in an absorption dynamometer of a frame having side members providing two bearings for engagement with a rotary shaft; a brake shoe mounted between said members and formed to engage a wheel on said shaft; an electro-magnet mounted on the frame; and a toggle actuated by said electro-magnet and operative on the brake shoe.

13. The combination in an absorption dynamometer of a frame having means for engaging a rotary shaft; a brake shoe mounted on the frame; an electro-magnet operatively connected to the brake shoe; and a counterweight normally balancing said brake shoe.

14. The combination in an absorption dynamometer of a frame having means for engaging a rotary shaft; an electro-magnet; a pair of toggle links carried by the frame and operatively connected to the movable member of the electro-magnet; a counterweight connected to one of the links of the toggle; and a brake shoe connected to the other toggle link.

15. The combination with an engine to be tested of a generator driven thereby; a brake shoe operative on a rotating portion of said engine; a frame journaled on the engine shaft; a brake shoe supported on said frame; an electro-magnet for actuating the shoe and electrically connected to the generator; with a weighing apparatus for measuring the rotative force exerted on the frame by the engine when the electro-magnet is energized.

16. The combination with an engine to be tested of a generator driven thereby; a brake shoe operative on a rotating portion of said engine; a frame journaled on the engine shaft; a brake shoe on the frame; an electromagnet operative on the brake shoe and electrically connected to the generator; a weighing apparatus for measuring the rotative force exerted on the frame by the engine when the electro-magnet is energized; with means for measuring the current supply to the electro-magnet.

17. The combination with an engine to be tested of a generator driven thereby; a brake shoe operative on a rotating portion of said engine; a frame journaled on the engine shaft; a brake shoe; an electro-magnet operative on the brake shoe and electrically connected to the generator; a weighing apparatus for measuring the rotative force exerted on the frame by the engine when the electro-magnet is energized; means for measuring the current supply to the electro-magnet; and means for varying said current.

18. The combination with an engine to be tested of a brake mechanism including an electromagnet for applying a load to said engine; and a machine driven by the engine for actuating said electromagnet with a device for measuring the load applied by the electromagnet.

19. The combination with an engine to be tested of a brake mechanism including an electromagnet for applying a load to said engine; means connected in circuit with said magnet for automatically causing the braking force to increase or decrease with an increase or decrease in the engine's speed with a device for measuring the load applied by the electromagnet.

20. The combination with an engine to be tested of a load-applying device including an electromagnet; and an electric generator having a substantially straight line speed-volts characteristic, driven by said engine and connected to energize said magnet with a device for measuring the load applied by the electromagnet.

21. The combination with an engine to be tested of a brake shoe; an electro-magnet device connected to said shoe for actuating the same; and an electric generator having a substantially straight line speed-volts characteristic, driven by the engine and connected to energize said electro-magnet.

In testimony whereof, I have signed my name to this specification, in the presence of two subscribing witnesses.

NATHAN C. JOHNSON.

Witnesses:
DANIEL EHNTHOLT, Jr.,
H. E. CLOONAN.